(12) United States Patent
Kong et al.

(10) Patent No.: US 10,061,186 B2
(45) Date of Patent: Aug. 28, 2018

(54) MOUNTING STRUCTURE FOR IMAGE DISPLAY APPARATUS

(71) Applicant: Hyundai Motor Company, Seoul (KR)

(72) Inventors: Nak Kyoung Kong, Seongnam-si (KR); Jong Min Park, Seoul (KR); Joong Ryoul Lee, Incheon (KR); Ki Hong Lee, Seoul (KR); Kap Je Sung, Suwon-si (KR); Jin Ho Hwang, Seoul (KR); Keon Soo Jin, Ulsan (KR); Jae Wook Lee, Seoul (KR); Chang Joon Seok, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/483,760

(22) Filed: Apr. 10, 2017

(65) Prior Publication Data

US 2018/0120679 A1 May 3, 2018

(30) Foreign Application Priority Data

Nov. 1, 2016 (KR) .................. 10-2016-0144261

(51) Int. Cl.
*G03B 21/14* (2006.01)
*B60R 1/12* (2006.01)
(Continued)

(52) U.S. Cl.
CPC .............. *G03B 21/145* (2013.01); *B60R 1/12* (2013.01); *B60R 11/02* (2013.01); *G03B 21/142* (2013.01);
(Continued)

(58) Field of Classification Search
CPC .... G03B 21/145; G03B 21/142; G03B 21/28; G03B 21/602; B60R 1/12; B60R 11/02; H04N 9/3147
See application file for complete search history.

(56) References Cited

U.S. PATENT DOCUMENTS 3,472,587 A * 10/1969 Liguori ................ G03B 21/001
353/34
8,876,301 B2 11/2014 Okura et al.
(Continued)

FOREIGN PATENT DOCUMENTS

JP 2006069266 A 3/2006
JP 2015012559 A 1/2015
(Continued)

*Primary Examiner* — Sultan Chowdhury
*Assistant Examiner* — Magda Cruz
(74) *Attorney, Agent, or Firm* — Slater Matsil, LLP (57) ABSTRACT

A mounting system is provided. The mounting system includes a plurality of image modules that project an image. A rotation bracket is disposed adjacent to each of the plurality of image modules. The rotation bracket is fixed to a base bracket. The base bracket is configured such that the plurality of image modules is coupled to a control unit and an image drive board. A mounting bracket is disposed adjacent to a position between the rotation bracket and the base bracket. A first reflective mirror is disposed adjacent to each of the image modules and fixed to the rotation bracket. A second reflective mirror is disposed on a lower surface of the base bracket at a position corresponding to the first reflective mirror. The base bracket is configured to be movable upwards or downwards in a height direction to adjust a height of the projected image.

20 Claims, 6 Drawing Sheets

(51) Int. Cl.
*B60R 11/02* (2006.01)
*G03B 21/28* (2006.01)
*G03B 21/602* (2014.01)
*H04N 9/31* (2006.01)

(52) U.S. Cl.
CPC ........... *G03B 21/28* (2013.01); *G03B 21/602* (2013.01); *H04N 9/3147* (2013.01)

(56) References Cited

U.S. PATENT DOCUMENTS

| | | | |
|---|---|---|---|
| 2005/0248729 A1* | 11/2005 | Drucker | G03B 21/28 353/71 |
| 2012/0300276 A1 | 11/2012 | Ohnishi | |
| 2016/0168098 A1 | 6/2016 | Jordan et al. | |
| 2016/0202472 A1 | 7/2016 | Sasaki | |

FOREIGN PATENT DOCUMENTS

| | | | |
|---|---|---|---|
| JP | 2015040925 A | 3/2015 |
| KR | 20080081806 A | 9/2008 |
| KR | 101596041 B1 | 2/2016 |

\* cited by examiner

MOUNTING STRUCTURE FOR IMAGE DISPLAY APPARATUS

CROSS-REFERENCE TO RELATED APPLICATIONS

This application claims under 35 U.S.C. § 119(a) the benefit of priority to Korean Patent Application No. 10-2016-0144261, filed on Nov. 1, 2016, the entire contents of which are incorporated herein by reference.

TECHNICAL FIELD

The present disclosure relates to a mounting structure for an image display device disposed in a vehicle.

BACKGROUND

Recently, to enhance the visibility for a vehicle, research on a vehicle including a camera module system provided with a plurality of cameras installed on the outside of the vehicle to enable a driver or a passenger in the vehicle to check outside conditions of the vehicle has been carried out.

Moreover, such a vehicle is provided with a screen for displaying images received from the plurality of cameras on the interior of the vehicle through an optical module. In this regard, development of related devices for assisting in driving of the vehicle and improving convenience in use has become active.

Meanwhile, unlike the configuration of an optical module embedded in a cowl top cover or a dashboard of a vehicle, in the case of a subminiature projection optical module mounted in an A-pillar or B-pillar, there is a problem of low visibility because the size of an image projected onto a screen is small.

Furthermore, with regard to installation of such a subminiature projector, it is not easy to dispose the projector in an interior part of the vehicle and secure a space for configuration of a projection type optical module for projecting an image having a predetermined size sufficient to provide appropriate visibility.

Moreover, in the case of an image display apparatus including a plurality of image modules configured to project images onto a screen, there is a problem in that it is difficult to adjust images projected from two or more image modules.

As a conventional technology, a projection lens unit for a PICO projector is disclosed in Korean Patent Application No. 10-2008-0081806 (hereinafter, referred to as 'Document 1'). The conventional projection lens unit includes a lens array formed of five sheets, a color synthesizing prism, a cover glass and an image panel.

However, in the case of the configuration of Document 1, it cannot solve a problem of difficulty in installation of an image display apparatus including a subminiature projector. Also, there is still a problem in that, when an image display apparatus including a plurality of image modules is installed, it is difficult to adjust images projected from the respective image modules.

RELATED ART DOCUMENT

Patent Document (Document 1): Korean Patent Application No. 10-2008-0081806

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

An object of the present invention is to make it possible to perform adjustment of an image projected from an image display apparatus disposed in a confined space in a vehicle.

Another object of the present invention is to project a clear projection image of an image display apparatus disposed in a confined space, onto an image display screen.

Yet another object of the present invention is to provide a mounting apparatus for making it possible to adjust, when an image display apparatus is configured with a plurality of image modules, a plurality of images projected from the respective image modules.

A mounting structure for an image display apparatus for achieving the above-mentioned objects of the present invention includes the following configuration.

In one aspect, the present invention provides a mounting structure for an image display apparatus, including: a plurality of image modules each configured to project an image; a rotation bracket disposed adjacent to each of the plurality of image modules; a base bracket to which the rotation bracket is fixed, the base bracket being configured such that the plurality of image modules are coupled to a control unit and an image drive board; a mounting bracket disposed adjacent to a position between the rotation bracket and the base bracket; a first reflective mirror disposed adjacent to each of the image modules and fixed to the rotation bracket; and a second reflective mirror disposed on a lower surface of the base bracket at a position corresponding to the first reflective mirror, wherein the base bracket is configured to be movable upwards or downwards in a height direction to adjust a height of the projected image.

In a preferred embodiment, the rotation bracket may be formed to be rotatable so that the image projected from the corresponding image module can be rotated.

In another preferred embodiment, the rotation bracket may be configured to be rotatable with a center pin of the mounting bracket as a center axis.

In still another preferred embodiment, the mounting bracket may include a guide boss configured to allow the mounting bracket to be movable in a horizontal direction with respect to an image projection direction of the image modules so that a size of the projected image can be adjusted.

In yet another preferred embodiment, the mounting bracket may include a guide boss configured to allow the mounting bracket to be movable in a vertical direction with respect to an image projection direction of the image modules so that a position of the projected image with respect to a left-right direction can be adjusted.

In still yet another preferred embodiment, the base bracket may be coupled to a base connected with the drive board and the control unit.

In a further preferred embodiment, the rotation bracket, the mounting bracket and the base bracket may be fixed by a fastening plate.

In another further preferred embodiment, the base bracket may include: a base boss provided in an up-down direction of the base bracket; an elastic member configured to be compressed by the base boss to provide a tensile force upwards; and a mirror holder configured to fix the second reflective mirror, wherein the base bracket may be configured to be movable along the base boss in an up-down direction.

In one aspect, the present invention provides a mounting structure for an image display apparatus in an A-pillar of a vehicle, including: a plurality of image modules each configured to project an image onto an image display screen of the A-pillar; a rotation bracket disposed adjacent to the plurality of image modules; a base bracket to which the rotation bracket is fixed, the base bracket being configured such that the plurality of image modules are coupled to a control unit and an image drive board; a mounting bracket disposed adjacent to the rotation bracket and the base bracket; a first reflective mirror disposed adjacent to each of the image modules and fixed to the rotation bracket; and a second reflective mirror disposed on a lower surface of the base bracket at a position corresponding to the first reflective mirror, wherein the base bracket is configured to be movable upwards or downwards in a height direction to adjust a height of the projected image.

In a preferred embodiment, the rotation bracket may be formed to be rotatable so that the image projected from each of the image modules can be rotated.

In another preferred embodiment, the rotation bracket may be configured to be rotatable with a center pin of the mounting bracket as a center axis.

In still another further preferred embodiment, the mounting bracket may include a guide boss configured to allow the mounting bracket to be movable in a horizontal direction with respect to an image projection direction of the image modules so that a size of the projected image can be adjusted In still another preferred embodiment, the mounting bracket includes a guide boss configured to allow the mounting bracket to be movable in a vertical direction with respect to an image projection direction of the image modules so that a position of the projected image with respect to a left-right direction can be adjusted.

In yet another further preferred embodiment, the base bracket is coupled to a base connected with the drive board and the control unit.

In still yet another further preferred embodiment, the rotation bracket, the mounting bracket and the base bracket may be fixed by a fastening plate.

In a still further preferred embodiment, the base bracket may include: a base boss provided in an up-down direction; an elastic member configured to be compressed by the base boss to provide a tensile force upwards; and a mirror holder configured to fix the second reflective mirror, wherein the base bracket may be configured to be movable along the base boss in an up-down direction.

In a yet still further preferred embodiment, the image display screen may further include a Fresnel lens.

In a yet still further preferred embodiment, the image display screen may include a diffusing film and a substrate lens.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

The present disclosure relates to a mounting structure for an image display device disposed in a vehicle. More particularly, it relates to a mounting structure which makes it possible to adjust, in a horizontal direction, a vertical direction, a height direction and a rotational direction, the position of an image projected from an image display apparatus disposed in a confined space of an internal part of the vehicle such as an A-pillar, a dashboard, etc.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Furthermore, the terms, such as " . . . part", " . . . unit", "module", "assembly", etc., indicate a unit for processing at least one function or operation.

In the following detailed description, names of constituents, which are in the same relationship, are divided into "the first", "the second", etc., but the present invention is not necessarily limited to the order in the following description.

The present invention relates to a mounting structure for an image display apparatus which is disposed in an interior trim of a vehicle. The mounting structure for the image display apparatus is configured with a plurality of brackets for adjusting an image to be projected. Furthermore, the mounting structure for the image display apparatus includes a first reflective mirror 500 and a second reflective mirror 600 which are configured such that a projected image is enlarged so as to effectively utilize a confined space in the vehicle. A projection type image display apparatus having an area ranging from 93 cm$^2$ to 100 cm$^2$ may be installed at a position at which the distance between an image module 100 and an image display screen 1000 ranges from 15 mm to 25 mm.

Figure 1:
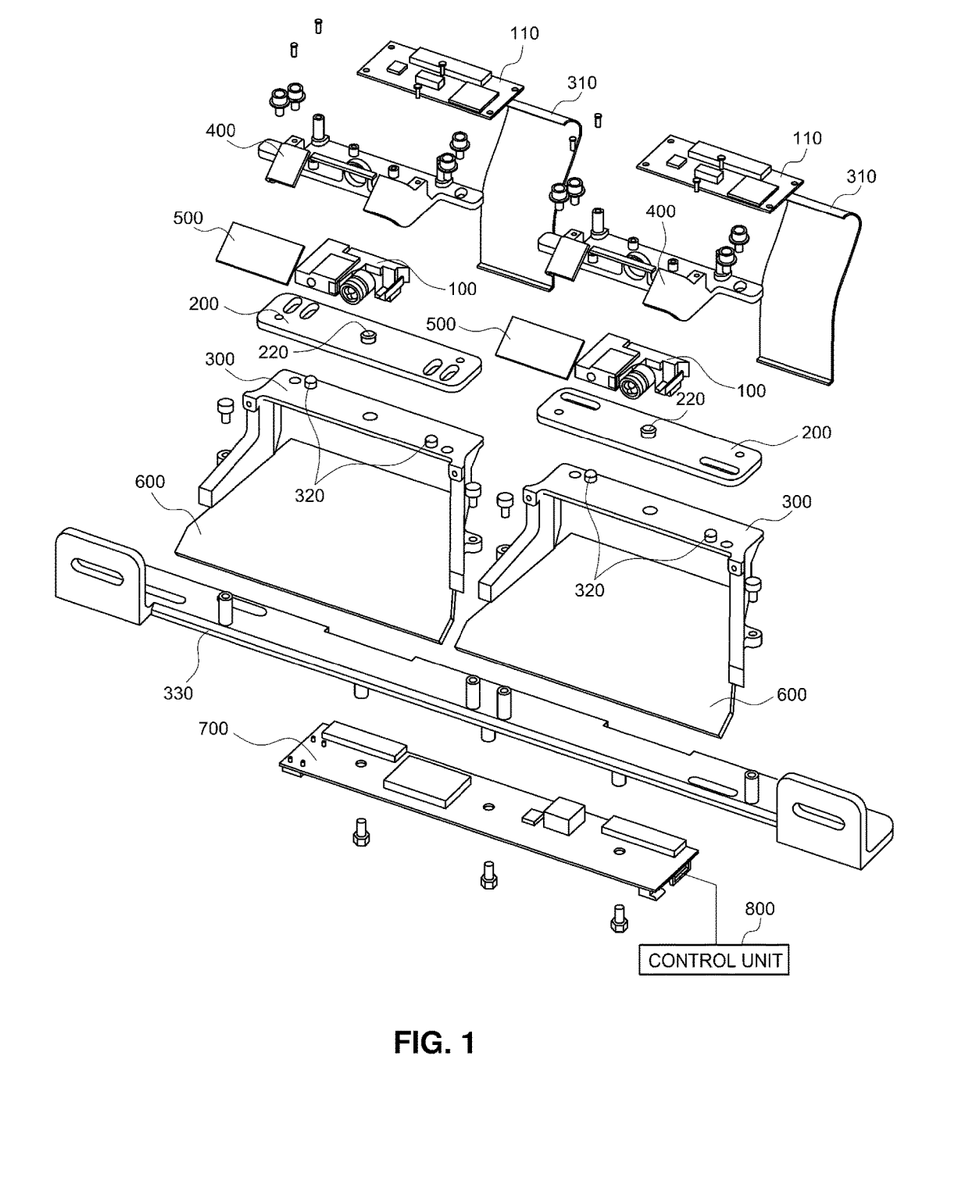
FIG. 1 is an exploded perspective view illustrating a mounting structure for an image display apparatus according to an embodiment of the present invention.

FIG. 1 illustrates the configuration of a mounting structure for an image display apparatus according to an embodiment of the present invention.

As shown in the drawing, the mounting structure for the image display apparatus includes a projection type image module 100. The image module 100 may includes a projection optical system and an illumination optical system. The illumination optical system may include a digital micromirror device (DMD) and be configured such that an image projected from the DMD element is incident on the projection optical system.

The image module 100 may be configured to be disposed on a rotation bracket 400. The rotation bracket 400 may be configured to be sequentially disposed on a mounting bracket 200 and a base bracket 300.

The base bracket 300 is coupled with a base 330 fixed to a vehicle body and functions to fix the image display apparatus and the mounting structure for the image display apparatus.

The base 330 is coupled to an image drive board 700 and a control unit 800 disposed in the vehicle. In addition, the base 330 is coupled to the image module 100 through the base bracket 300.

The image drive board 700 functions to transmit an image to be projected to the image module 100 in response to a signal received by the control unit 800. The control unit 800 may be configured to transmit a command for adjusting the configurations of a plurality of brackets constituting the image display apparatus according to an image adjustment signal of a user.

The rotation bracket 400 is configured so as to be rotatable with a center pin 220 of the mounting bracket 200 as a center axis. The rotation bracket 400 functions to change a direction of projection of the image module 100 fixed and disposed on the rotation bracket 400.

In addition, the rotation bracket 400 is configured such that the first reflective mirror 500 is fixed to a surface of the rotation bracket 400 that faces the image module 100. That is, the first reflective mirror 500 is configured to face the second reflective mirror 600 at a position to which an image is projected from the image module 100.

The first reflective mirror 500 having the above-mentioned configuration makes an image projected from the image module 100 be incident on the second reflective mirror 600. For this, the first reflective mirror 500 is configured to form an angle ranging from 51° to 55° relative to the image module 100 based on the horizontal direction.

An image reflected by the first reflective mirror 500 is projected onto the second reflective mirror 600. The second reflective mirror 600 is configured to re-reflect the projected image and project it onto the image display screen 1000.

The second reflective mirror 600 may be configured to be disposed on a mirror holder formed on a lower surface of the base bracket 300. That is, the second reflective mirror 600 is disposed on the lower surface of the base bracket 300 and configured to face the first reflective mirror 500, and functions to re-reflect an incident image transmitted from the first reflective mirror 500 and project it onto the image display screen 1000.

The mounting bracket 200 is configured such that a guide 320 disposed on an upper end of the base bracket 300 is inserted into a guide boss 210 disposed on the mounting bracket 200. As the guide boss 210 moves along the guide 320, the mounting bracket 200 can move along the guide boss 210. The mounting bracket 200 is configured so as to be movable in a linear direction with respect to the image module 100 fixed on the mounting bracket 200. That is, the mounting bracket 200 to which the image module 100 is fixed can move in a longitudinal direction of the guide boss 210. Accordingly, the distance between the image module 100 and the image display screen 1000 can be changed so that the size of an image to be projected onto the image display screen 1000 can be adjusted. The image module 100 can be moved to the left or the right under the guidance of a guide boss 210 extending in the left-right direction so that the left-right distance of an image displayed on the screen 100 can be adjusted.

The mounting structure for the image display apparatus includes a fastening plate 310 configured to fix the base bracket 300, the mounting bracket 200 and the rotation bracket 400. The fastening plate 310 is configured such that it is fixed to a rear surface of the base bracket 300 and a rear surface of the rotation bracket 400 in a locking form.

More preferably, in an embodiment of the present invention, the fastening plate 310 may be configured to be fixed to the drive board forming the image module 100. The fastening plate 310 functions to fix each bracket of the mounting structure for the image display apparatus.

Figure 2:
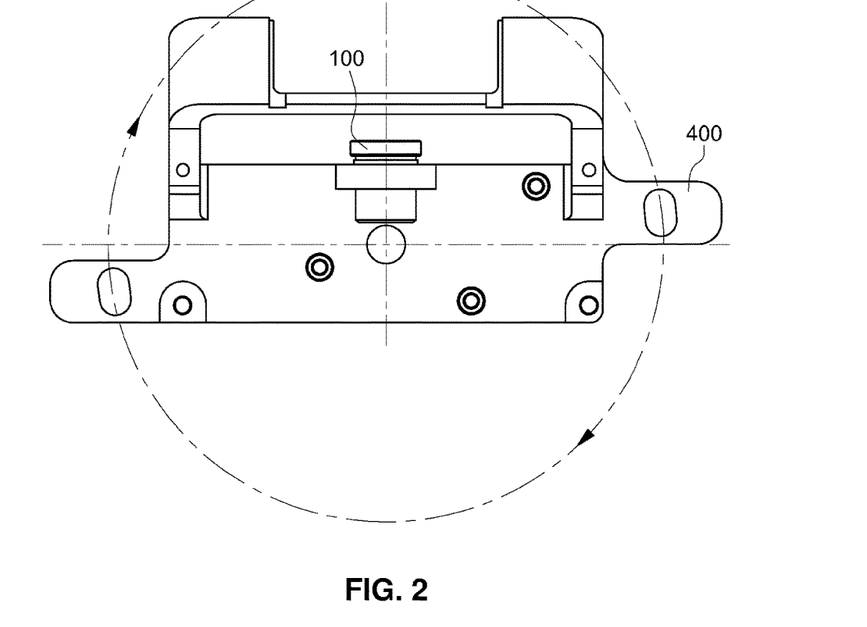
FIG. 2 is a view illustrating a rotation bracket of the mounting structure for the image display apparatus according to an embodiment of the present invention.

FIG. 2 illustrates the rotation bracket 400 according to the present invention and shows a radius range within which the rotation bracket 400 can rotate around a center axis.

The rotation bracket 400 according to the present invention is configured to have the same center axis as that of the center pin 220 provided on the upper surface of the base bracket 300 and is configured to be rotatable in a clockwise or counterclockwise direction.

Furthermore, the rotation bracket 400 includes at least one or more rotation guide bosses 410 which are disposed on respective opposite ends of the rotation bracket 400 to determine a turning radius. The rotation bracket 400 is configured to be rotatable along the rotation guide bosses 410.

More preferably, in an embodiment of the present invention, the rotation bracket 400 that is rotatable along the rotation guide bosses 410 is configured to be rotatable by 3.3° in opposite directions so that the projection angle of the image module 100 can move by 3.3° in opposite directions.

As described above, the image module 100 is fixed to the rotation bracket 400. The rotation bracket 400 including the fixed image module 100 is configured such that it can rotate along space formed in the rotation guide bosses 410, thus making it possible to rotate an image projected onto the image display screen 1000.

Figure 3:
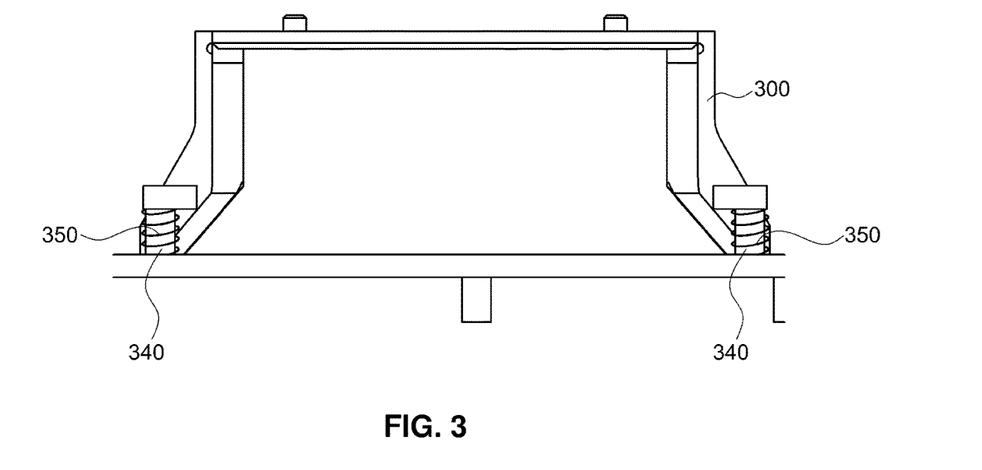
FIG. 3 is a view illustrating a base bracket capable of adjusting the height of an image to be projected according to an embodiment of the present invention.

FIG. 3 illustrates the base bracket 300 having a height adjustable structure according to an embodiment of the present invention.

As shown in the drawing, the base bracket 300 includes a base boss 340 which is provided in a vertical direction of the base bracket 300, and an elastic member 350 which is compressed by the base boss 340 and provides tensile force in the vertical direction.

Furthermore, the base bracket 300 includes a mirror holder which is disposed on the lower surface of the base bracket 300 and fixes the second reflective mirror 600. The base bracket 300 is configured such that a projection image reflected by the second reflective mirror 600 is projected onto the image display screen 1000.

As such, the base bracket 300 may be configured such that an upper base bracket 300 and a lower base bracket 300 are coupled to each other along the base boss 340. The base bracket 300 is configured to move in the vertical direction along the base boss 340 so that the height of the rotation bracket 400 that is disposed adjacent to the upper surface of the base boss 340 can be adjusted. That is, the base bracket 300 is configured such that the height of the image module 100 fixed to the rotation bracket 400 is adjusted.

More preferably, the base boss 340 may be configured to be extendable, whereby the height of the base bracket 300 can be adjusted. Therefore, according to a request of the user, the heights of the base bracket 300 and the image module 100 can be controlled by adjusting the length of the base boss 340.

Furthermore, the elastic member 350 that is disposed along the base boss 340 is configured to be maintained in a compressed shape formed when it is initially mounted. Thus, even when the upper surface of the base bracket 300 is disposed at the highest position, the elastic member 350 can provide elastic force in a direction in which the base bracket 300 extends.

Moreover, there are provided a plurality of typical structures (not shown) for fixing the position of the base boss 340, whereby the base boss 340 may be configured to be locked at a predetermined height. That is, a locking protrusion may be used, or the fastening plate 310 may be used. In another embodiment of the present invention, the mounting structure for the image display apparatus may include an actuator-coupled configuration. In this case, the mounting structure for the image display apparatus may be configured such that the base boss 340 is locked at a predetermined height by a command of the control unit 800.

Figure 4:
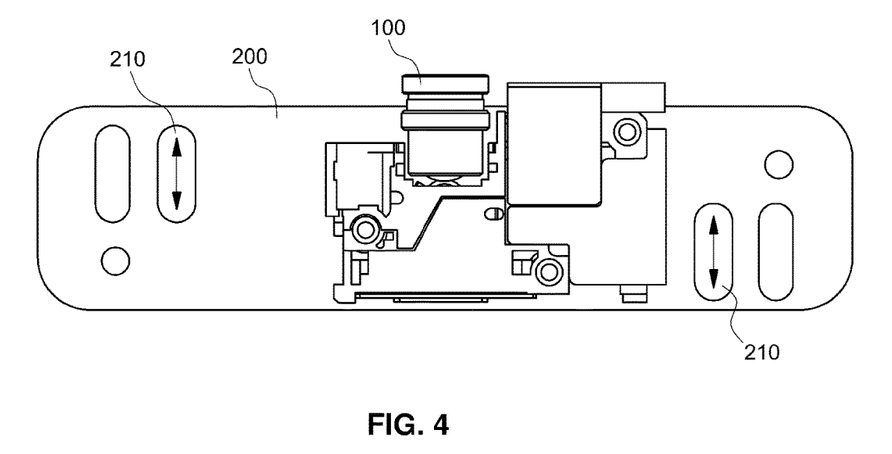
FIG. 4 is a view illustrating the base bracket capable of adjusting the size of an image to be projected according to an embodiment of the present invention.

FIG. 4 illustrates a mounting bracket 200 that is movable in the horizontal direction, according to an embodiment of the present invention.

The mounting bracket 200 is configured to include at least one or more guide bosses 210. Guides 320 provided on the upper surface of the base bracket 300 are inserted into the corresponding guide bosses 210.

Moreover, the guide bosses 210 are formed such that the mounting bracket 200 is linearly movable. For this, each guide boss 210 may have a depressed structure extending a predetermined length toward the image display screen 1000 in the horizontal direction.

As shown in the drawing, the mounting bracket 200 includes the guide bosses 210 for making it possible for the mounting bracket 200 to move in the horizontal direction and the direction in which an image is projected from the image module 100. A hole of each guide boss 210 has a horizontally extending shape.

The guide boss 210 having the above-mentioned structure is formed such that the corresponding guide 320 disposed on the base bracket 300 can move in the guide boss 210 in the horizontal direction and, in addition, the rotation bracket 400 fixed on the mounting bracket 200 can simultaneously move in the horizontal direction.

As such, in the case where the rotation bracket 400 moves along with the mounting bracket 200 in the horizontal direction, the image module 100 fixed on the rotation bracket 400 is moved toward or away from the image display screen 1000, whereby the size of the projection image on the image display screen 1000 can be adjusted.

Figure 5:
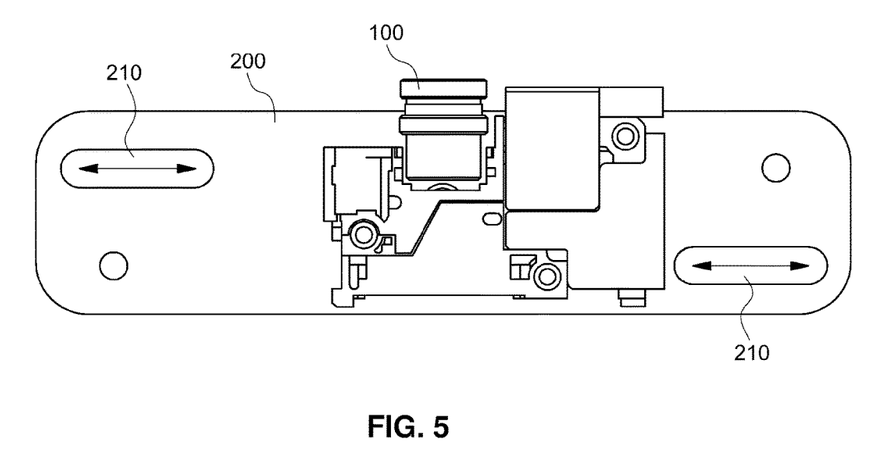
FIG. 5 is a view illustrating the base bracket capable of adjusting the left-right position of an image to be projected according to an embodiment of the present invention.

FIG. 5 illustrates a mounting bracket 200 that is movable in the vertical direction, according to an embodiment of the present invention.

As shown in the drawing, the mounting bracket 200 may include guide bosses 210 each of which extends a predetermined length in the vertical direction of the image module 100 and the image display screen 1000, wherein the guides 320 provided on the upper surface of the base bracket 300 are inserted into the respective guide bosses 210 so as to be movable.

That is, as the mounting bracket 200 moves to the left or the right by the length of the guide boss 210, the image module 100 disposed on the rotation bracket 400 is simultaneously moved to the left or the right. As such, the mounting bracket 200 may be configured such that the position of an image projected onto the image display screen 1000 can be adjusted to the left or the right.

As shown in FIGS. 4 and 5, the mounting bracket 200 is configured so as to be selectively linearly movable in the horizontal or vertical direction of the image projection direction of the image module 100. In the case where the mounting structure for the image display apparatus includes two image modules 100 as an embodiment of the present invention, a mounting structure including one image module 100 may include the mounting bracket 200 that is movable in the horizontal direction, and a mounting structure including the other image module 100 may include the mounting bracket 200 that is movable in the vertical direction. In this case, the mounting structure for the image display apparatus may be configured such that images projected from the respective image modules 100 can be individually adjusted.

That is, an image display apparatus assembly including one image module 100 can adjust the size of an image projected from the image module 100 through the mounting bracket 200 that is movable in the horizontal direction. An image display assembly including the other image module 100 can adjust the position of an image to the left or the right through the mounting bracket 200 that is movable in the vertical direction. According to a request of the user, the size and the left-right gap of the image projected onto the screen 1000 can be adjusted.

Figure 6:
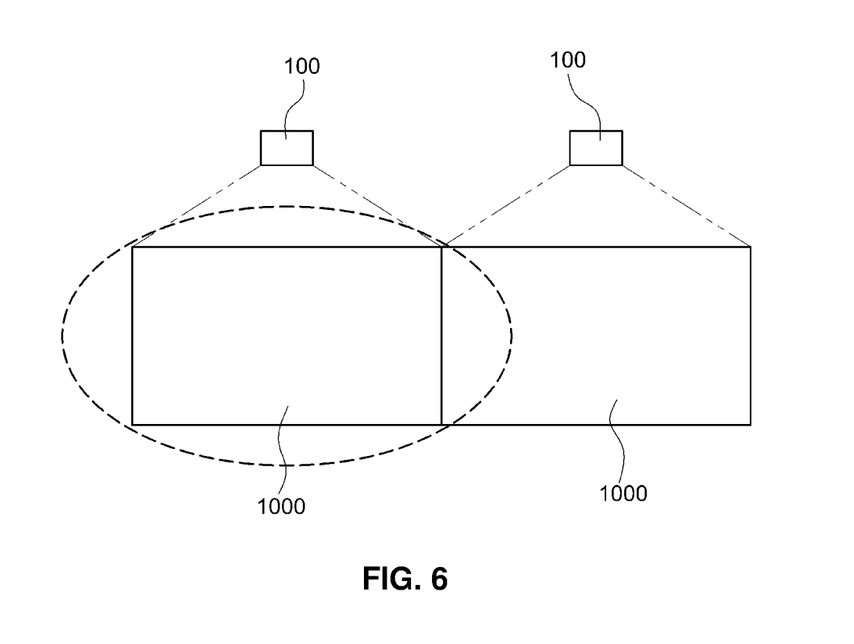
FIG. 6 is a view showing an image projected using a mounting structure for two image display apparatuses according to an embodiment of the present invention.

FIG. 6 illustrates the configuration of the image display screen 1000 for displaying an image projected from two image modules 100 according to an embodiment of the present invention.

As shown in the drawing, in the case of an image display apparatus including the two image modules 100, images are projected onto image display screens 1000 that are individually configured. In this case, the two screens 1000 are disposed adjacent to each other and receives an image that is projected from the two image modules 100.

Moreover, each of the plurality of image modules 100 is provided with a rotation bracket 400, a mounting bracket 200 and a base bracket 300 which are configured to correspond to the associated image modules 100 and form an assembly form with the associated image modules 100. In this way, the plurality of image modules 100 may be configured in the image display apparatus.

The rotation bracket 400 that is coupled to each image module 100 in an assembly form is configured to make it possible to rotate an image projected from the image module 100, and the base bracket 300 is configured to make it possible to adjust the height of the image.

Furthermore, the mounting bracket 200 configured with each image module 100 in an assembly form may selectively have a horizontally movable structure or a vertically movable structure for convenience in use.

In yet another embodiment of the present invention, there is provided a single image display screen 1000, wherein an image is projected onto the single image display screen 1000 through a plurality of image modules 100.

Figure 7:
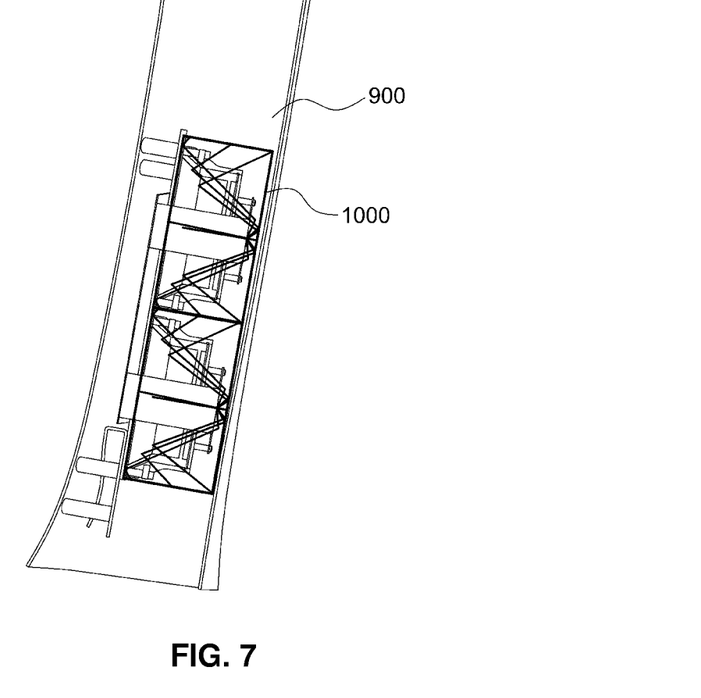
FIG. 7 is a view illustrating the mounting structure for two image display apparatuses that is disposed in an A-pillar, according to an embodiment of the present invention.

FIG. 7 illustrates a mounting structure for an image display apparatus disposed in an A-pillar 900 according to an embodiment of the present invention.

As shown in the drawing, there is illustrated the mounting structure for the image display apparatus disposed in the A-pillar 900 of the vehicle. That is, this drawing illustrates a configuration in which an image projected from the image module 100 is displayed on the image display screen 1000 disposed in the vehicle.

The image display apparatus including the two image modules 100 is installed in the A-pillar 900 and configured to enlarge an image projected from image modules 100 using two reflective plates and project the image onto the image display screen 1000. Furthermore, the image display apparatus is configured with a mounting bracket 200, a rotation bracket 400 and a base bracket 300 to make it possible to adjust the height, up-down and left-right gaps, and rotational orientation of an image projected from each image module 100.

Figure 8:
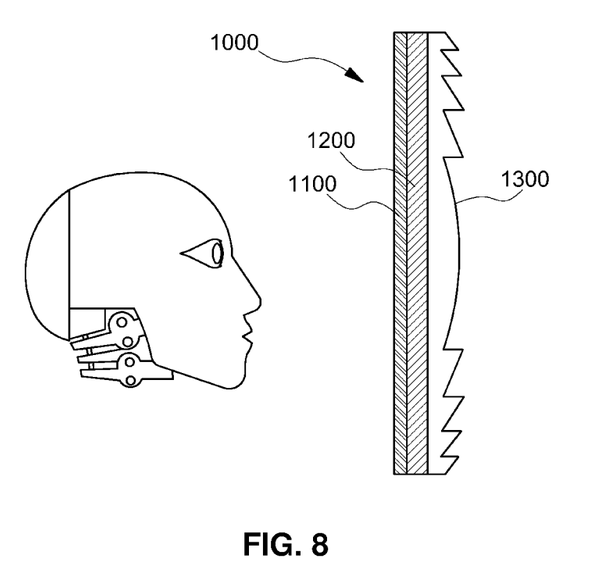
FIG. 8 is a sectional view illustrating an image display screen according to an embodiment of the present invention.

FIG. 8 is a sectional view showing the configuration of the image display screen 1000 according to an embodiment of the present invention.

The image display screen 1000 may be configured in the form in which a substrate lens 1200 formed of polycarbonate (PC) or acryl, a diffusing film 1100 and a Fresnel lens 1300 are stacked. The diffusing film 1100 is disposed inside the vehicle at a position onto which an image is projected, and the substrate lens 1200 and the Fresnel lens 1300 are sequentially stacked toward a side at which the image display apparatus is disposed.

In another embodiment of the present invention, the image display screen 1000 may be configured in such a way that, inside a vehicle, a substrate lens 1200 formed of polycarbonate (PC) or acryl is disposed at a position at which an image is projected, and the substrate lens 1200, the diffusing film 1100 and the Fresnel lens 1300 are sequentially stacked towards the inside of the optical module is disposed.

The foregoing detailed descriptions may be merely an example of the present invention. Also, the inventive concept is explained by describing the preferred embodiments and will be used through various combinations, modifications and environments. That is, the inventive concept may be amended or modified, not being out of the scope, technical idea or knowledge in the art. The embodiments described hereinabove are further intended to explain best modes known of practicing the invention and to enable others skilled in the art to utilize the invention in such, or other, embodiments and with the various modifications required by the particular applications or uses of the invention. Therefore, the description is not intended to limit the invention to the form disclosed herein. Also, it is intended that the appended claims be construed to include alternative embodiments.

As is apparent from the above description, a mounting structure for an image display apparatus according to the present invention has the following effects.

The present invention provides a plurality of image modules disposed in a confined space and can be configured to include a wider image display screen disposed in an internal space of a vehicle, whereby a confined space in the vehicle can be more effectively used.

Furthermore, the present invention is able to project an image onto a wide image display screen with high visibility and make it possible to perform adjustment of a displayed image, thus enhancing convenience for a user.

In addition, the present invention is configured such that a plurality of image display apparatus mounting structures can be coupled to each other, whereby depending on specifications of a vehicle or a production request of a user, the size of an image to be projected onto the image display screen can be selectively provided.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A mounting system comprising:
   a plurality of image modules each configured to project an image;
   a rotation bracket disposed adjacent to each of the plurality of image modules;
   a base bracket to which the rotation bracket is fixed, the base bracket being configured such that the plurality of image modules are coupled to a control unit and an image drive board;
   a mounting bracket disposed adjacent to a position between the rotation bracket and the base bracket, wherein the mounting bracket includes a guide boss configured to allow the mounting bracket to be movable in a horizontal direction or a vertical direction;
   a first reflective mirror disposed adjacent to each of the image modules and fixed to the rotation bracket; and
   a second reflective mirror disposed on a lower surface of the base bracket at a position corresponding to the first reflective mirror,
   wherein the base bracket is configured to be movable upwards or downwards in a height direction to adjust a height of the projected image.

2. The mounting system of claim 1, wherein the rotation bracket is formed to be rotatable so that the image projected from the corresponding one of the plurality of image modules is rotated.

3. The mounting system of claim 2, wherein the rotation bracket is configured to be rotatable with a center pin of the mounting bracket as a center axis.

4. The mounting system of claim 1, wherein the guide boss is configured to allow the mounting bracket to be movable in the horizontal direction with respect to an image projection direction of the image modules so that a size of the projected image is adjusted.

5. The mounting system of claim 1, wherein the guide boss is configured to allow the mounting bracket to be movable in the vertical direction with respect to an image projection direction of the image modules so that a position of the projected image with respect to a left-right direction is adjusted.

6. The mounting system of claim 1, wherein the base bracket is coupled to a base connected with the image drive board and the control unit.

7. The mounting system of claim 1, wherein the rotation bracket, the mounting bracket and the base bracket are fixed by a fastening plate.

8. The mounting system of claim 1, wherein the base bracket comprises:
   a base boss provided in an up-down direction of the base bracket;
   an elastic member configured to be compressed by the base boss to provide a tensile force upwards; and
   a mirror holder configured to fix the second reflective mirror,
   wherein the base bracket is configured to be movable along the base boss in an up-down direction.

9. A mounting system comprising:
   a plurality of image modules each configured to project an image onto an image display screen mounted to an A-pillar of a vehicle;
   a rotation bracket disposed adjacent to the plurality of image modules;
   a base bracket to which the rotation bracket is fixed, the base bracket being configured such that the plurality of image modules are coupled to a control unit and an image drive board;
   a mounting bracket disposed adjacent to the rotation bracket and the base bracket;
   a first reflective mirror disposed adjacent to each of the image modules and fixed to the rotation bracket; and
   a second reflective mirror disposed on a lower surface of the base bracket at a position corresponding to the first reflective mirror,
   wherein the base bracket is configured to be movable upwards or downwards in a height direction to adjust a height of the projected image.

10. The mounting system of claim 9, wherein the rotation bracket is formed to be rotatable so that the image projected from each of the image modules is rotated.

11. The mounting system of claim 10, wherein the rotation bracket is configured to be rotatable with a center pin of the mounting bracket as a center axis.

12. The mounting system of claim 9, wherein the mounting bracket includes a guide boss configured to allow the mounting bracket to be movable in a horizontal direction with respect to an image projection direction of the image modules so that a size of the projected image is adjusted.

13. The mounting system of claim 9, wherein the mounting bracket includes a guide boss configured to allow the mounting bracket to be movable in a vertical direction with respect to an image projection direction of the image modules so that a position of the projected image with respect to a left-right direction is adjusted.

14. The mounting system of claim 9, wherein the base bracket is coupled to a base connected with the image drive board and the control unit.

15. The mounting system of claim 9, wherein the rotation bracket, the mounting bracket and the base bracket are fixed by a fastening plate.

16. The mounting system of claim 9, wherein the base bracket comprises:
   a base boss provided in an up-down direction;
   an elastic member configured to be compressed by the base boss to provide a tensile force upwards; and
   a mirror holder configured to fix the second reflective mirror,
   wherein the base bracket is configured to be movable along the base boss in an up-down direction.

17. The mounting system of claim 9, wherein the image display screen further comprises a Fresnel lens.

18. The mounting system of claim 9, wherein the image display screen includes a diffusing film and a substrate lens.

19. A mounting structure for an image display apparatus, the mounting structure comprising:
   a rotation bracket disposed under the image display apparatus, wherein the image display apparatus comprises a plurality of optical systems, a plurality of first reflective mirrors, a plurality of second reflective mirrors, wherein each of the plurality of optical systems is configured to project an image, wherein one of the plurality of first reflective mirrors is disposed adjacent to each of the plurality of optical systems, wherein one of the plurality of second reflective mirrors is disposed facing an associated one of the plurality of second reflective mirrors, wherein the rotation bracket is configured to attach each of the plurality of first reflective mirrors adjacent to each of the plurality of optical systems;
   a base bracket to which the rotation bracket is fixed, the base bracket being configured such that the plurality of optical systems are coupled to a control unit and an image drive board; and
   a mounting bracket disposed adjacent to a position between the rotation bracket and the base bracket, wherein the mounting bracket includes a guide boss configured to allow the mounting bracket to be movable in a horizontal direction or a vertical direction;
   wherein a lower surface of the base bracket is configured to attach each of the plurality of second reflective mirrors at a position corresponding to the associated one of the plurality of first reflective mirrors, and
   wherein the base bracket is configured to be movable upwards or downwards in a height direction to adjust a height of a projected image.

20. The mounting structure of claim 19, wherein the rotation bracket is configured to be rotatable with a center pin of the mounting bracket as a center axis.

* * * * *